United States Patent
Torrents Comas

(10) Patent No.: US 10,597,880 B2
(45) Date of Patent: Mar. 24, 2020

(54) LEVELLING SPACER DEVICE FOR LAYING SLAB PRODUCTS FOR CLADDING LAYING SURFACES, AND A COMPUTER PROGRAM PRODUCT

(71) Applicant: TORRENTS RESEARCH, S.L., Mataró (ES)

(72) Inventor: Josep Torrents Comas, Sant Vicenç de Montalt (ES)

(73) Assignee: TORRENTS RESEARCH, S.L., Barcelona (ES)

( * ) Notice: Subject to any disclaimer, the term of this patent is extended or adjusted under 35 U.S.C. 154(b) by 0 days.

(21) Appl. No.: 16/122,238

(22) Filed: Sep. 5, 2018

(65) Prior Publication Data
US 2019/0169863 A1 Jun. 6, 2019

(30) Foreign Application Priority Data
Dec. 4, 2017 (EP) .................................... 17382834

(51) Int. Cl.
*E04F 21/18* (2006.01)
*B33Y 80/00* (2015.01)
(Continued)

(52) U.S. Cl.
CPC .......... *E04F 21/1877* (2013.01); *B33Y 80/00* (2014.12); *E04F 13/0892* (2013.01);
(Continued)

(58) Field of Classification Search
CPC .............. E04F 21/1877; E04F 13/0892; E04F 15/02022
See application file for complete search history.

(56) References Cited

U.S. PATENT DOCUMENTS 5,603,195 A * 2/1997 Cosentino ........... E04F 13/0892
52/749.11
8,887,475 B2 * 11/2014 Ghelfi ................. E04F 21/0092
52/749.11

(Continued)

FOREIGN PATENT DOCUMENTS

EP 2 565 346 9/2016

OTHER PUBLICATIONS

Extended European Search Report for EP 17382834 dated May 3, 2018.

*Primary Examiner* — Paola Agudelo
(74) *Attorney, Agent, or Firm* — Jenkins, Wilson, Taylor & Hunt, P.A.

(57) ABSTRACT

Provided is a levelling spacer device for laying slab products for cladding laying surfaces. In some embodiments, the levelling spacer device includes a support having a base and a separator element provided with a through-window with two upper tilted sub-edges and a lower edge; and a presser wedge to be inserted in the through-window and to slide restingly on the in-view surface of the slab products, with an upper face having two adjacent areas running longitudinally along the length of the pressing wedge, and that are tilted downwards towards each other along a common convergent axis, and that cooperate, each, with a respective one of the two upper tilted sub-edges to push the slab products downwards. Also provided is a computer program product for manufacturing the presently disclosed device by 3D printing.

11 Claims, 6 Drawing Sheets

(51) Int. Cl.
*E04F 15/02* (2006.01)
*E04F 13/08* (2006.01)
*E04F 21/00* (2006.01)
*E04F 21/22* (2006.01)

(52) U.S. Cl.
CPC .. *E04F 15/02022* (2013.01); *E04F 15/02044* (2013.01); *E04F 21/0092* (2013.01); *E04F 21/22* (2013.01)

(56) References Cited

U.S. PATENT DOCUMENTS

| | | | |
|---|---|---|---|
| 9,260,872 B2 * | 2/2016 | Bunch | E04F 21/0092 |
| 9,534,403 B2 * | 1/2017 | Biec | E04F 21/0092 |
| 9,834,943 B1 * | 12/2017 | Kufner | E04F 21/1877 |
| 9,970,203 B1 * | 5/2018 | Abidov | E04F 21/0092 |
| 2014/0325935 A1 * | 11/2014 | Hoffman | E04F 21/22 |
| | | | 52/747.11 |
| 2015/0027082 A1 * | 1/2015 | Hoffman | E04F 21/0092 |
| | | | 52/749.11 |
| 2015/0240504 A1 * | 8/2015 | Hoffman | E04F 21/20 |
| | | | 29/244 |
| 2016/0186449 A1 * | 6/2016 | Lee | E04F 21/0092 |
| | | | 33/527 |
| 2016/0222679 A1 * | 8/2016 | Bunch | E04F 21/1844 |
| 2016/0244980 A1 | 8/2016 | Urban | |
| 2016/0348381 A1 * | 12/2016 | Meyers | E04F 21/1877 |
| 2018/0355623 A1 * | 12/2018 | Frisco | E04F 21/0092 |
| 2019/0063084 A1 * | 2/2019 | Bunch | E04F 21/0092 |
| 2019/0169863 A1 * | 6/2019 | Torrents Comas | |
| | | | E04F 13/0892 |

\* cited by examiner

LEVELLING SPACER DEVICE FOR LAYING SLAB PRODUCTS FOR CLADDING LAYING SURFACES, AND A COMPUTER PROGRAM PRODUCT

CROSS-REFERENCE TO RELATED APPLICATIONS

This application is based on and claims the benefit of priority from European Patent Application No. 17382834, filed on Dec. 4, 2017, the contents of which are expressly incorporated by reference herein.

TECHNICAL FIELD

The present invention relates, in first aspect, to a levelling spacer device for laying slab products, such as tiles and the like, for cladding laying surfaces, such as treadable surfaces, floors, wall coverings or ceilings and the like.

A second aspect of the invention relates to a computer program for manufacturing the device of the first aspect of the invention by 3D printing.

BACKGROUND

Different types of levelling spacer devices for laying slab products for cladding laying surfaces are known in the art.

Specifically, among others, EP2565346B1 discloses a levelling spacer device including the features of the preamble of claim 1 of the present invention, i.e.:
  a support comprising a base, positionable on the backside of a laying surface of at least two slab products that are adjacent and flanked with respect to a flanking direction, and at least a separator element projecting from said base and configured and arranged to contact at least a portion of facing flanks of the two slab products, said separator element being provided with a through-window with an upper edge destined to be located superiorly of the level of an in-view surface of the slab products and a lower edge destined to be located inferiorly of the level of said in-view surface of the slab products; and
  a presser wedge configured and arranged to be inserted in the through-window and to slide restingly on the in-view surface of the slab products, with an upper face cooperating with the upper edge of the through-window to push the slab products towards the base.

Although the force exerted to push the slab products towards the base is enough for many applications, there are other applications for which a larger push force (and therefore a larger pressure, for the same area) is required in order to assure a more accurate leveling of adjacent slab products (for example when the amount of cement under adjacent slab products is not uniform) and/or for providing a stronger gluing of the slab products to the cladding laying surface.

It is, therefore, necessary to provide an alternative to the state of the art which covers the gaps found therein, by providing a levelling spacer device which really provides such a larger push force.

SUMMARY

To that end, the present invention relates, in a first aspect, to a levelling spacer device for laying slab products for cladding laying surfaces, which comprises:
  a support comprising a base, positionable on the backside of a laying surface of at least two slab products that are adjacent and flanked with respect to a flanking direction, and at least a separator element projecting from said base and configured and arranged to contact at least a portion of facing flanks of the two slab products, said separator element being provided with a through-window with an upper edge destined to be located superiorly of the level of an in-view surface of the slab products and a lower edge destined to be located inferiorly of the level of said in-view surface of the slab products; and
  a presser wedge configured and arranged to be inserted in the through-window and to slide restingly on the in-view surface of the slab products, with an upper face cooperating with the upper edge of the through-window to push the slab products towards the base.

The upper face of the presser wedge of the levelling spacing device of the first aspect of the present invention comprises at least two adjacent areas running longitudinally along at least a portion of the length of the pressing wedge and that are tilted downwards towards a common convergent axis (thus, substantially providing a V-shaped cross section), and the upper edge of the through-window of the separator element of the support comprises at least two upper tilted sub-edges, each configured and arranged to cooperate with a respective area of the at least two adjacent areas.

By means of said tilted configuration of both the at least two adjacent areas of the presser wedge and the at least two upper tilted sub-edges, a considerably larger pressure to push the slab products towards the base is exerted, in comparison with the devices of the prior art.

Specifically, that larger pressure is applied because of the specific force gradient distribution applied on the adjacent tilted areas, which has a larger push force component around the common convergent axis (i.e. around the vertex of the V-shaped cross section), which means that such a large push force is applied on a smaller area, thus causing a larger pressure be exerted around the common convergent axis.

In addition, as the inclined plane constituted by the two adjacent tilted areas is larger than the flat plane constituted by the flat area of a conventional presser wedge, hence force applied by the two upper tilted sub-edges is exerted on a larger area than the one of the conventional presser wedges.

For an embodiment, more than two adjacent areas of the presser wedge are provided, for example four adjacent areas arranged to provide a W-shaped cross-section, wherein the upper edge of the through-window of the separator element of the support comprises one upper tilted sub-edge per adjacent area, tilted in correspondence with the inclination of the respective adjacent area, i.e. also arranged according to a W-shape.

According to an embodiment, each of the adjacent areas comprises a plurality of abutting elements arranged in a respective row, and wherein each of the upper tilted sub-edges is configured and arranged to cooperate with a respective one of said pluralities of abutting elements.

For an implementation of said embodiment, the abutting elements of one of the pluralities of abutting elements are longitudinally offset along its row with respect to the abutting elements of the other plurality of abutting elements.

Preferably, the longitudinal offset of the abutting elements is of one half of their pitch.

The upper tilted sub-edges are configured and arranged so that when one of them cooperates with one of the abutting elements, the other upper tilted sub-edge doesn't cooperate with any abutting element.

Generally the abutting elements define ridges, and valleys are defined between each two contiguous ridges, each of said valleys defining a respective engaging position for retention latching pawls constituted by the upper tilted sub-edges.

For a preferred embodiment, the abutting elements are teeth or the like.

According to an embodiment, the presser wedge comprises a longitudinal slit running between the at least two adjacent areas.

For an embodiment for which there are four or more than two adjacent areas, the presser wedge comprises several longitudinal slits arranged in parallel and each between two different adjacent areas.

The separator element has a projection member per longitudinal slit, which is configured and arranged to fit into the longitudinal slit and slide there through in a guided manner when the presser wedge slides restingly on the in-view surface of the slab products.

For an embodiment, the presser wedge is symmetrical with respect to a symmetry plane passing through the above mentioned common convergent axis perpendicularly to a lower face of the presser wedge.

A second aspect of the present invention relates to a computer program product, comprising a non-transitory computer-readable storage medium, and computer program code instructions, encoded on the non-transitory computer-readable storage medium, that include a digital representation of the levelling spacer device of the first aspect of the invention, wherein the program code instructions are configured, when run in a processor controlling the operation of a 3D (three-dimensional) printer, to make the 3D printer manufacture the levelling spacer device of the first aspect of the invention, with any kind of material considered appropriate for such a manufacturing process, such as metals, porcelain, sandstone, or, preferably, plastics.

BRIEF DESCRIPTION OF THE FIGURES

In the following some preferred embodiments of the invention will be described with reference to the enclosed figures. They are provided only for illustration purposes without however limiting the scope of the invention.

DETAILED DESCRIPTION

Two different embodiments are illustrated by the accompanying drawings, specifically a first embodiment by FIGS. 1 to 6, and a second embodiment by FIGS. 7 to 12.

Both of said embodiments related to the levelling spacer device of the first aspect of the invention, for laying slab products P for cladding laying surfaces, which comprises support S and presser wedge W.

Figure 1:
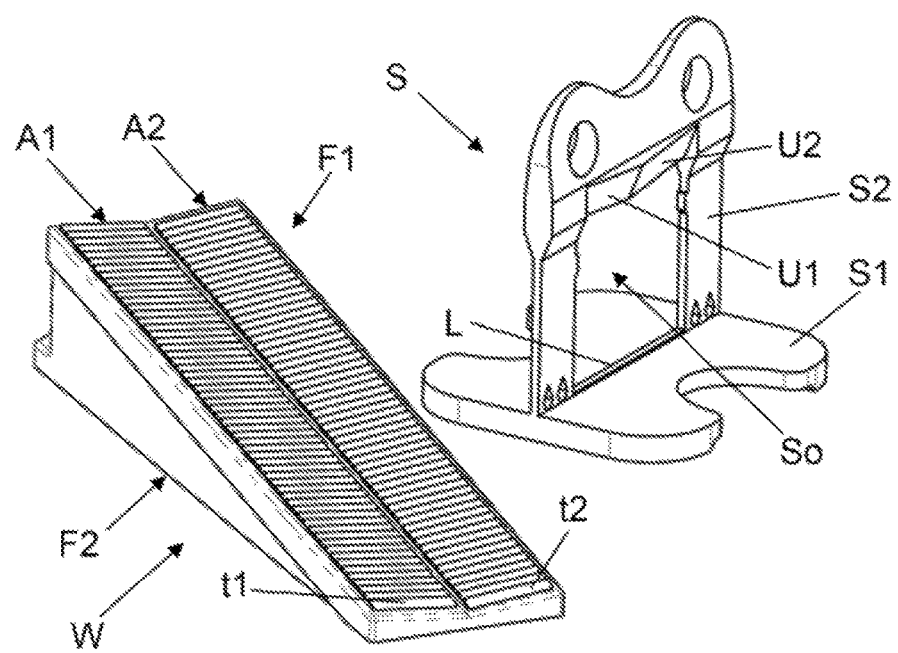
FIG. 1 is a perspective view of the device of the first aspect of the present invention, for a first embodiment, where the support and the presser wedge are depicted in an uncoupled position.
Figure 2:
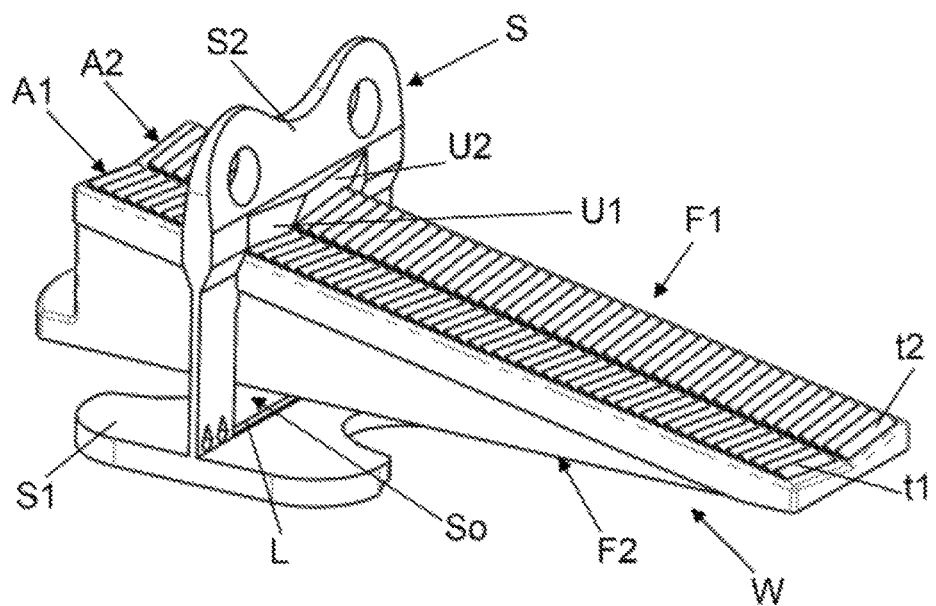
FIG. 2 is a further perspective view of the device of the first aspect of the present invention, for the first embodiment, where the support and the presser wedge are depicted in a coupled position.
Figure 3:
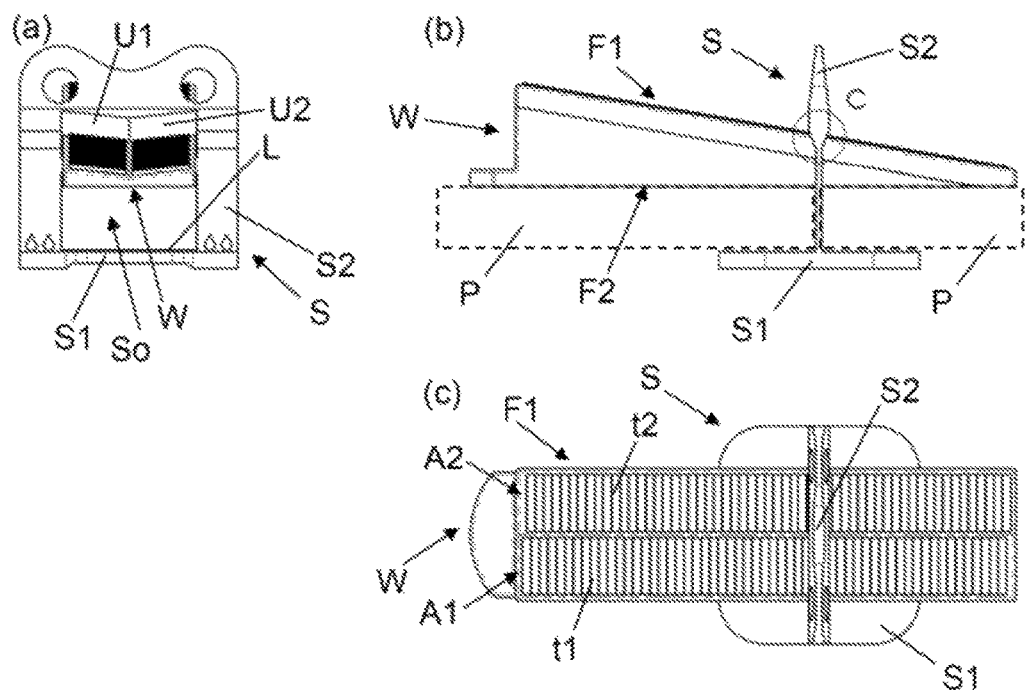
FIG. 3 also shows the device of the first aspect of the present invention for the first embodiment, where the support and the presser wedge are coupled to each other, by means of three views: (a) a front elevation view; (b) a side elevation view; and (c) a top view.
Figure 9:
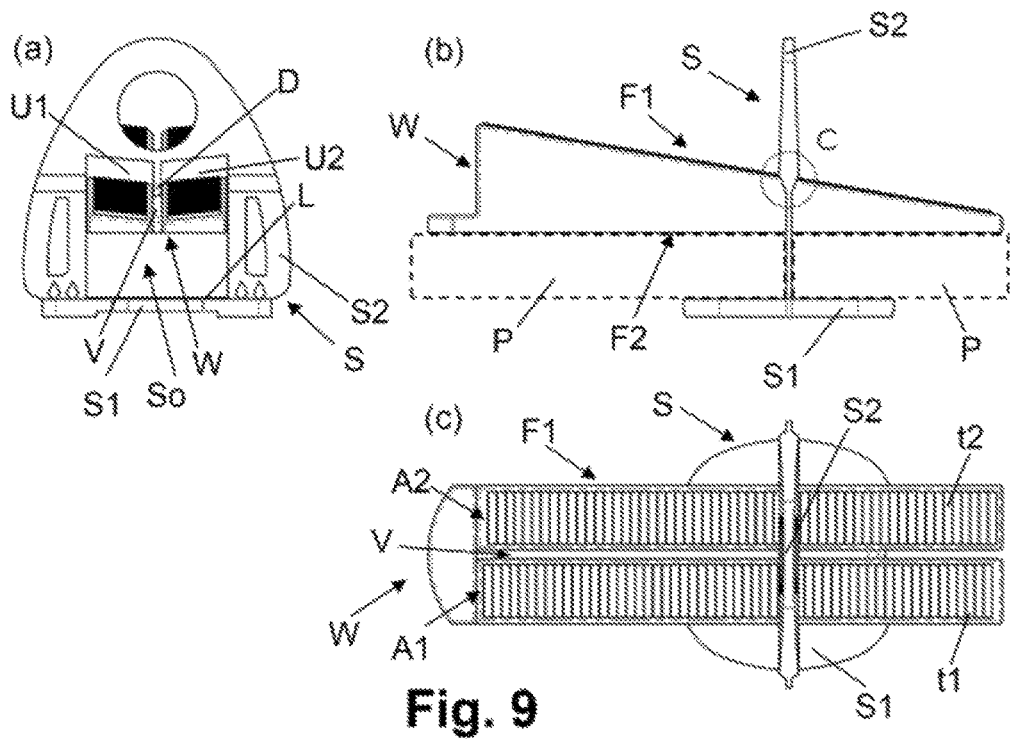
FIG. 9 also shows the device of the first aspect of the present invention for the second embodiment, where the support and the presser wedge are coupled to each other, by means of three views: (a) a front elevation view; (b) a side elevation view; and (c) a top view.

Support S comprises base S1, positionable on the backside of a laying surface of two slab products P (shown in dashed lines in view (b) of FIGS. 3 and 9) that are adjacent and flanked with respect to a flanking direction, and separator element S2 projecting from base S1 and configured and arranged to contact a portion of facing flanks of the two slab products P (as shown in view (b) of FIGS. 3 and 9).

Separator element S2 is provided with through-window So with an upper edge that comprises (as shown in FIGS. 1, 2, 3(a), 5 (left view), 8, 9(a), and 11 (left view), two upper tilted sub-edges U1 and U2 destined to be located superiorly of the level of an in-view surface of slab products P and lower edge L destined to be located inferiorly of the level of the in-view surface of slab products P.

Although for the illustrated embodiments, separator element S2 defines a portal structure, as it is formed by two columns and a cross-bar delimiting, together with lower edge L, through-window So, for other embodiments (non-illustrated) separator element S2 can have a different shape, and define another kind of opening, such as a cut-out opening, and/or there can be more than one through-window So (or opening), each intended for the insertion and sliding there through of a portion of the presser wedge, or of a presser wedge where there are more than one presser wedges.

Presser wedge W is configured and arranged to be inserted in through-window So (as shown in FIGS. 2, 3, 5, 8, 9, and 11) and to slide restingly (by lower face F2) on the in-view surface of slab products P, with upper face F1 cooperating with upper edge U of through-window So to push slab products P towards base S1: i.e. to exert a vertical force on the portions of slab products P placed below the device, so that they are levelled and fixed to the underlying cladding laying surfaces.

As shown in FIGS. 1, 2, 3(c), 7, 8, and 9(c), upper face F1 of presser wedge W comprises two adjacent areas A1 and A2 running longitudinally along most of the length of pressing wedge W and that are tilted downwards towards a common convergent axis, each of the two adjacent areas A1 and A2 cooperating with a respective one of the two upper tilted sub-edges U1 and U2.

Each of the two adjacent areas A1 and A2 comprises a plurality of abutting elements t1 and t2, arranged in a respective row, and each of upper tilted sub-edges U1 and U2 is configured and arranged to cooperate with a respective one of said pluralities of abutting elements t1 and t2.

For the illustrated embodiments, abutting elements t1 and t2 are teeth defining ridges, and valleys are defined between each two contiguous ridges, each of said valleys defining a respective engaging position for retention latching pawls constituted by upper tilted sub-edges U1 and U2.

Figure 4:
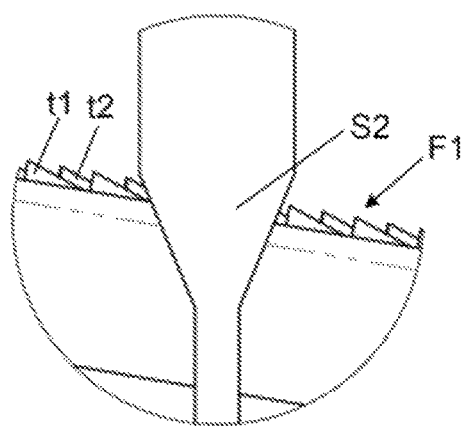
FIG. 4 is an enlarged view of detail C indicated in FIG. 3(b)
Figure 5:
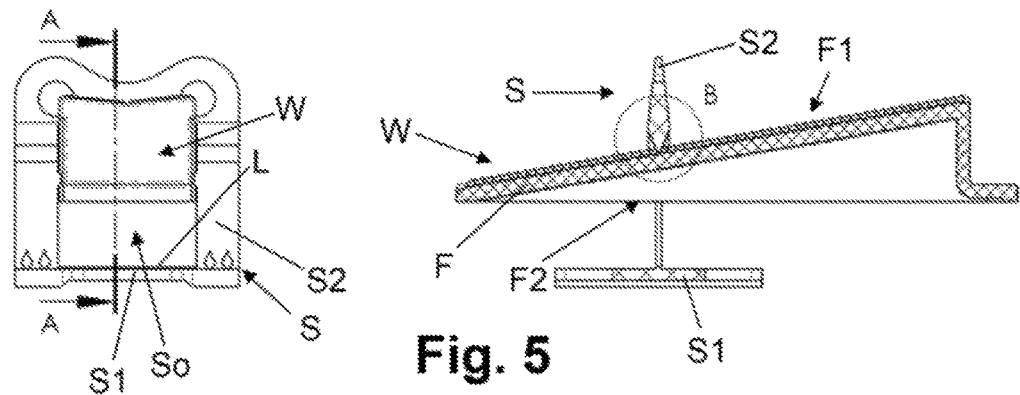
FIG. 5 shows, at its left view, a back elevation view of the device of FIG. 3, and, at its right view, a side elevation cross-section view taken along a cut plane indicated by A-A in the left view of FIG. 5.
Figure 6:
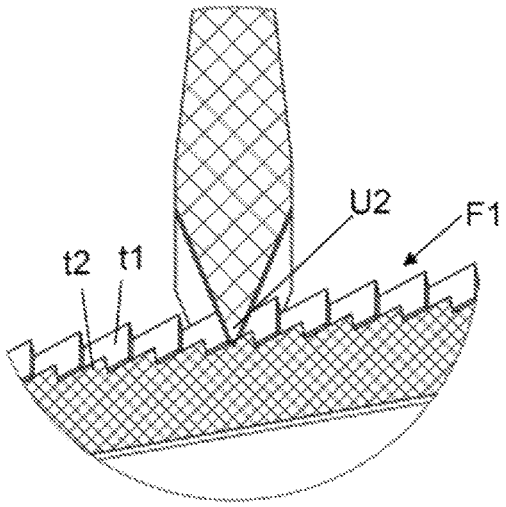
FIG. 6 is an enlarged view of detail B indicated in FIG. 5, right view.
Figure 10:
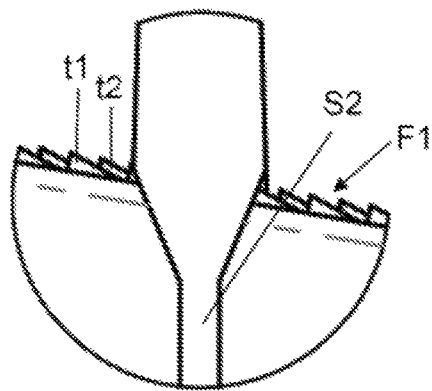
FIG. 10 is an enlarged view of detail C indicated in FIG. 9(b)
Figure 11:
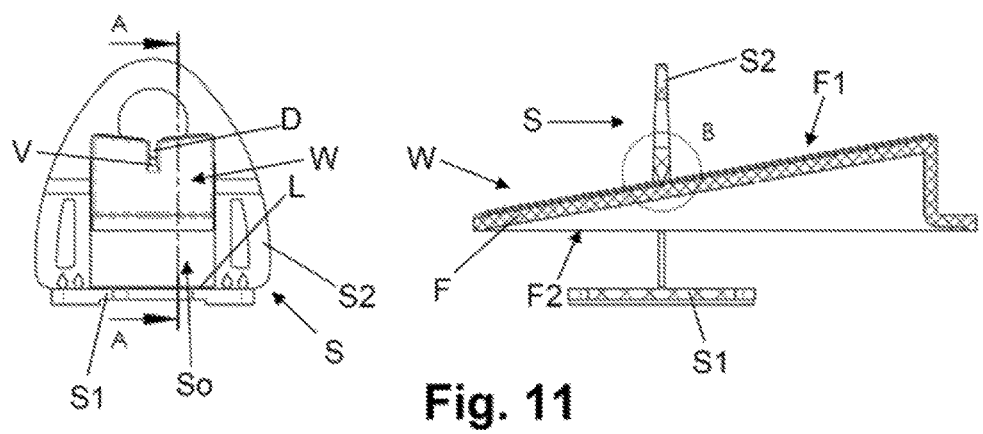
FIG. 11 shows, at its left view, a back elevation view of the device of FIG. 9, and, at its right view, a side elevation cross-section view taken along a cut plane indicated by A-A in the left view of FIG. 11.
Figure 12:
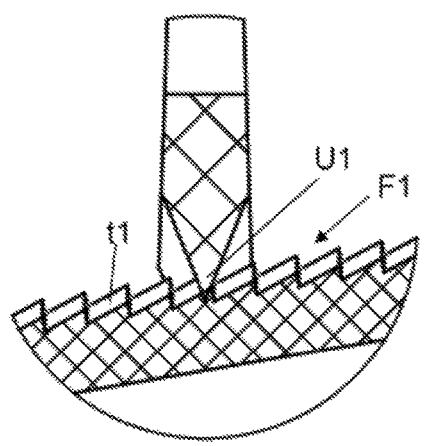
FIG. 12 is an enlarged view of detail B indicated in FIG. 11, right view.

Abutting elements t1 and t2 of one of the pluralities of abutting elements t1 and t2 are longitudinally offset along its row with respect to abutting elements t1 and t2 of the other plurality of abutting elements t1 and t2 by one half of their pitch, as clearly shown in FIGS. 4, 6 and 10.

Upper tilted sub-edges U1 and U2 are configured and arranged so that when one of U1 and U2 cooperates with one of abutting elements t1, t2, i.e. is engaged in one of the above mentioned engaging positions between two teeth t1 and t2 (as shown in FIG. 6, where sub-edge U2 is engaged between two adjacent teeth t1), the other of upper tilted sub-edge U2 and U1 doesn't cooperate with any abutting element t1 and t2, i.e. is not engaged in any engaging position. With this arrangement, the number of engaging positions is doubled in comparison to an arrangement where there was no longitudinal offset between teeth t1 and t2.

For the embodiment of FIGS. 7 to 12, presser wedge W comprises longitudinal slit V running between two adjacent areas A1 and A2, and separator element S2 has projection member D configured and arranged to fit into longitudinal slit V and slide there through in a guided manner when presser wedge W slides restingly on the in-view surface of slab products P. Via this arrangement of projection member D and longitudinal slit V, a guided displacement of presser wedge W though through-window So of support S is provided, which allows a quicker and easier use of the device to a user.

Figure 7:
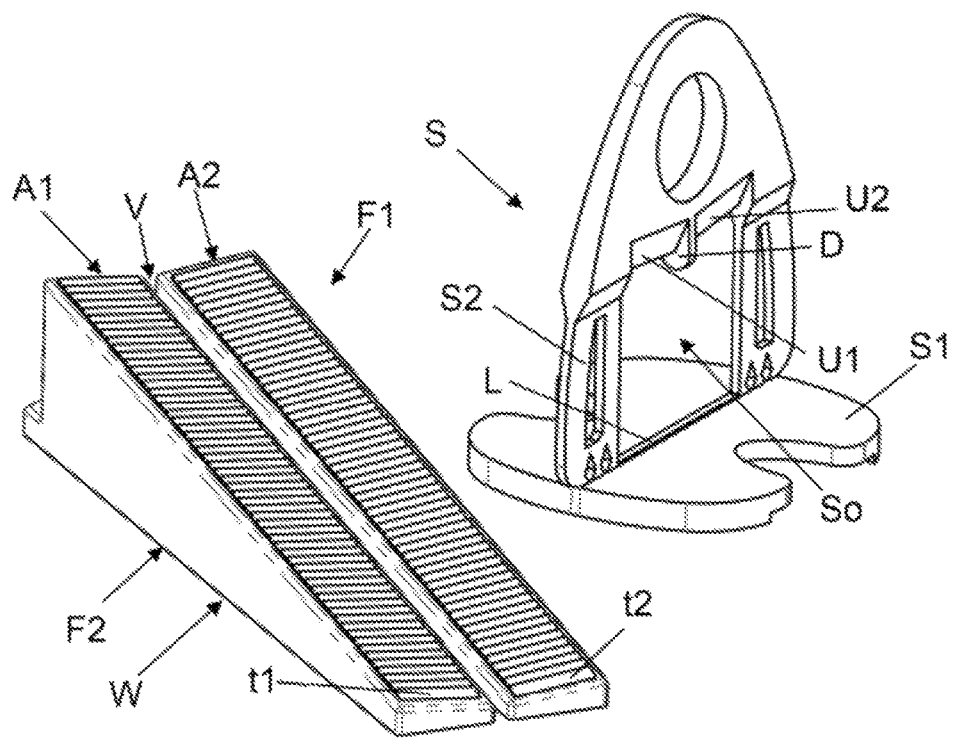
FIG. 7 is a perspective view of the device of the first aspect of the present invention, for a second embodiment, where the support and the presser wedge are depicted in an uncoupled position.
Figure 8:
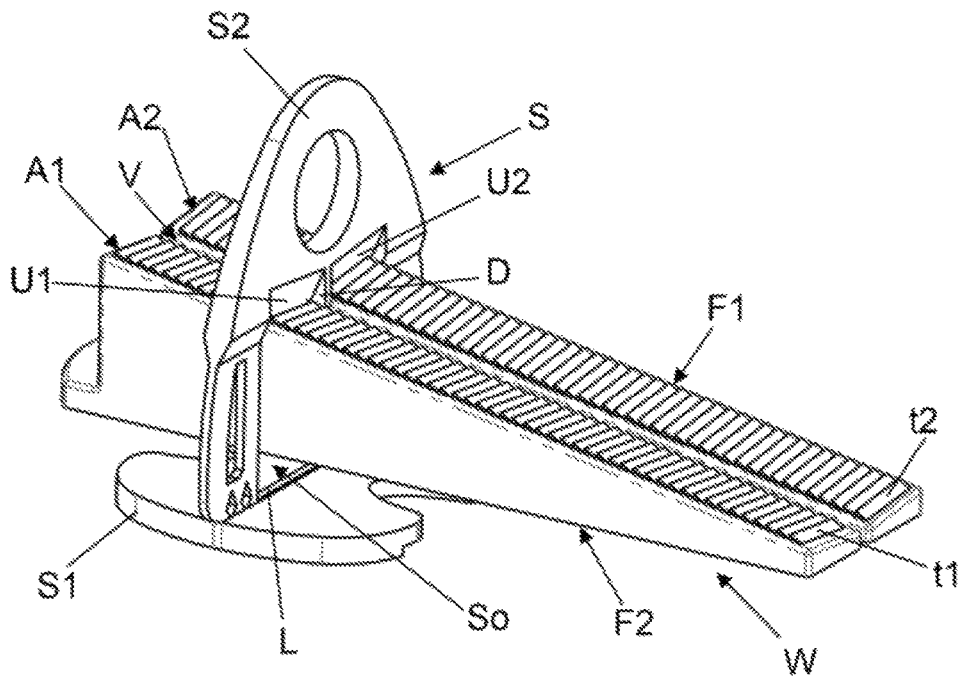
FIG. 8 is a further perspective view of the device of the first aspect of the present invention, for the second embodiment, where the support and the presser wedge are depicted in a coupled position.

For the embodiments illustrated, as shown in FIGS. 7, 8 and 9, longitudinal slit V traverses completely inclined wall F (see FIG. 11, right view) of presser wedge W, although for other alternative embodiments (not illustrated), longitudinal slit V does not traverse completely inclined wall F.

Finally, for the illustrated embodiments, presser wedge W is symmetrical with respect to a symmetry plane passing through the common convergent axis perpendicularly to a resting plane including lower face F2 of presser wedge W, although for other embodiments (not illustrated) presser wedge W can be asymmetrical with respect to at least said "symmetry" plane.

A person skilled in the art could introduce changes and modifications in the embodiments described without departing from the scope of the invention as it is defined in the attached claims.

What is claimed is:

1. A levelling spacer device for laying slab products for cladding laying surfaces, comprising:
   a support comprising a base, positionable on the backside of a laying surface of at least two slab products that are adjacent and flanked with respect to a flanking direction, and at least one separator element projecting from said base and configured and arranged to contact at least a portion of facing flanks of the at least two slab products when said support is positioned on the backside of said laying surface of the at least two slab products, said at least one separator element being provided with a through-window with an upper edge destined to be located superiorly of the level of an in-view surface of the at least two slab products and a lower edge destined to be located inferiorly of the level of said in-view surface of the at least two slab products; and
   a presser wedge configured and arranged to be inserted in the through-window and to slide restingly on the in-view surface of the at least two slab products, with an upper face cooperating with the upper edge of the through-window to push the at least two slab products towards the base of the support;
   wherein said upper face of the presser wedge comprises at least two adjacent areas running longitudinally along at least a portion of the length of the pressing wedge and that are tilted downwards towards each other along a common convergent axis, and further wherein said upper edge comprises at least two upper tilted sub-edges, each configured and arranged to cooperate with a respective area of the at least two adjacent areas.

2. The levelling spacer device of claim 1, wherein each of said at least two adjacent areas comprises a plurality of abutting elements arranged in a respective row, and wherein each of said upper tilted sub-edges is configured and arranged to cooperate with a respective one of said pluralities of abutting elements.

3. The levelling spacer device of claim 2, wherein the abutting elements of one of the pluralities of abutting elements are longitudinally offset along its row with respect to the abutting elements of the other plurality of abutting elements.

4. The levelling spacer device of claim 3, wherein the longitudinal offset of the abutting elements is of one half of their pitch.

5. The levelling spacer device of claim 4, wherein the upper tilted sub-edges are configured and arranged so that when one of them cooperates with one of the abutting elements, the other upper tilted sub-edge doesn't cooperate with any abutting element.

6. The levelling spacer device of claim 2, wherein the abutting elements define ridges, and wherein valleys are defined between each two contiguous ridges, each of said valleys defining a respective engaging position for retention latching pawls constituted by the upper tilted sub-edges.

7. The levelling spacer device of claim 6, wherein the abutting elements are teeth.

8. The levelling spacer device of claim 1, wherein the presser wedge comprises a longitudinal slit running between the at least two adjacent areas.

9. The levelling spacer device of claim 8, wherein the separator element has a projection member configured and arranged to fit into the longitudinal slit and slide there through in a guided manner when the presser wedge slides restingly on the in-view surface of the slab products.

10. The levelling spacer device of claim 1, wherein the presser wedge is symmetrical with respect to a symmetry plane passing through said common convergent axis perpendicularly to a resting plane including a lower face of the presser wedge.

11. A computer program product comprising a non-transitory computer-readable storage medium and computer program code instructions encoded on the non-transitory computer-readable storage medium, that include a digital representation of a levelling spacer device for laying slab products for cladding laying surfaces, comprising:

a support comprising a base, positionable on the backside of a laying surface of at least two slab products that are adjacent and flanked with respect to a flanking direction, and at least one separator element projecting from said base and configured and arranged to contact at least a portion of facing flanks of the at least two slab products when said support is positioned on the backside of said laying surface of the at least two slab products, said at least one separator element being provided with a through-window with an upper edge destined to be located superiorly of the level of an in-view surface of the at least two slab products and a lower edge destined to be located inferiorly of the level of said in-view surface of the at least two slab products; and a presser wedge configured and arranged to be inserted in the through-window and to slide restingly on the in-view surface of the at least two slab products, with an upper face cooperating with the upper edge of the through-window to push the at least two slab products towards the base of the support, wherein said upper face of the presser wedge comprises at least two adjacent areas running longitudinally along at least a portion of the length of the pressing wedge and that are tilted downwards towards each other along a common convergent axis, and wherein said upper edge comprises at least two upper tilted sub-edges, each configured and arranged to cooperate with a respective area of the at least two adjacent areas, wherein the program code instructions are configured, when run in a processor controlling the operation of a 3D printer, to make said 3D printer manufacture said levelling spacer device.

* * * * *

UNITED STATES PATENT AND TRADEMARK OFFICE
CERTIFICATE OF CORRECTION

PATENT NO. : 10,597,880 B2
APPLICATION NO. : 16/122238
DATED : March 24, 2020
INVENTOR(S) : Josep Torrents Comas Page 1 of 1

It is certified that error appears in the above-identified patent and that said Letters Patent is hereby corrected as shown below:

On the Title Page

Item (73), should read:
--CORTAG INDUSTRIA E COMERCIA LTDA., MOGI MIRIM/SP, (BR)--

Signed and Sealed this
Ninth Day of June, 2020

Andrei Iancu
*Director of the United States Patent and Trademark Office*